United States Patent
Vangelov

(10) Patent No.: US 9,841,970 B2
(45) Date of Patent: Dec. 12, 2017

(54) VEHICLE CONTROL UPDATE METHODS AND SYSTEMS

(71) Applicant: Ford Global Technologies, LLC, Dearborn, MI (US)

(72) Inventor: John Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/595,410

(22) Filed: Jan. 13, 2015

(65) Prior Publication Data

US 2016/0202966 A1  Jul. 14, 2016

(51) Int. Cl.
| | |
|---|---|
| G06F 9/44 | (2006.01) |
| G06F 9/445 | (2006.01) |
| H04L 29/08 | (2006.01) |
| H04W 4/00 | (2009.01) |

(52) U.S. Cl.
CPC ............ *G06F 8/665* (2013.01); *H04L 67/12* (2013.01); *H04L 67/34* (2013.01); *H04W 4/001* (2013.01)

(58) Field of Classification Search
CPC .......... G06F 8/665; H04L 67/12; H04L 67/34
USPC ........................................................ 717/172
See application file for complete search history.

(56) References Cited

U.S. PATENT DOCUMENTS

| | | | |
|---|---|---|---|
| 6,370,456 B1 * | 4/2002 | Eiting et al. ..................... 701/36 |
| 8,381,036 B2 * | 2/2013 | Vidal et al. ................... 714/38.1 |
| 8,539,472 B2 * | 9/2013 | Fabregas et al. ............. 717/168 |
| 8,813,061 B2 * | 8/2014 | Hoffman et al. ............. 717/168 |
| 8,875,123 B2 * | 10/2014 | Shiba ............................ 717/173 |
| 9,098,374 B2 * | 8/2015 | Krenz | |
| 2005/0262498 A1 * | 11/2005 | Ferguson et al. ............. 717/172 |
| 2006/0021015 A1 * | 1/2006 | Chambers et al. ................ 726/9 |
| 2006/0130033 A1 * | 6/2006 | Stoffels et al. ............... 717/166 |
| 2006/0184927 A1 * | 8/2006 | Deblaquiere et al. ........ 717/168 |
| 2007/0100513 A1 * | 5/2007 | Asano ............................... 701/2 |
| 2009/0119657 A1 * | 5/2009 | Link, II ......................... 717/171 |
| 2009/0300595 A1 * | 12/2009 | Moran et al. ................. 717/170 |
| 2011/0208975 A1 * | 8/2011 | Sibert ........................... 713/189 |
| 2011/0307668 A1 * | 12/2011 | Fabregas et al. ............. 711/147 |
| 2013/0031540 A1 * | 1/2013 | Throop et al. ................ 717/173 |
| 2014/0109075 A1 * | 4/2014 | Hoffman et al. ............. 717/169 |
| 2014/0282470 A1 * | 9/2014 | Buga ........................ G06F 8/65 |
| | | | 717/170 |
| 2015/0347121 A1 * | 12/2015 | Harumoto | |

* cited by examiner

*Primary Examiner* — Lewis A Bullock, Jr.
*Assistant Examiner* — Theodore Hebert
(74) *Attorney, Agent, or Firm* — Jennifer M. Stec; Brooks Kushman P.C.

(57) ABSTRACT

A vehicle can include methods and systems to update controls in vehicle modules. The systems and methods can include receiving a control update for a receiving vehicle module to be stored at a first memory location, installing the received controls at the first memory location, running the module using controls at a second memory location, checking the controls at the first memory location, if checking is valid, operating the vehicle module using the controls at the first memory location in place of the controls at the second memory location. The vehicle module can operate the controls at the first memory location without waiting to restart the vehicle or can delay use of the controls until a later event, e.g., restart or download to other vehicle modules on which the current module may depend.

21 Claims, 7 Drawing Sheets

VEHICLE CONTROL UPDATE METHODS AND SYSTEMS

TECHNICAL FIELD

Systems and methods relating to updating vehicle control for a vehicle are described herein.

BACKGROUND

A vehicle has various components that may be controlled by software. At times software needs to be updated. To update software of a vehicle component, the vehicle may be driven to a dealership and serviced by a technician. The technician may connect a wire to the vehicle to utilize a system that tracks the individual software levels of every component in the vehicle as well as available software updates. The technician may manually apply the software updates indicated by the system and record any changes back into the system.

SUMMARY

Various methods and structures for updating controls in the vehicle and vehicle modules are described herein. A vehicle controls updating method can include receiving a control update for a vehicle module to be stored at a first memory location, installing the received control update at the first memory location, running the module using controls at a second memory location, checking the control update at the first memory location, if checking is valid, operating the vehicle module using the control update at the first memory location in place of at least one of the controls at the second memory location.

In an example, operating includes delaying operating the control update at the first memory location until restarting the vehicle.

In an example, the controls at the second memory location include engine controls.

In an example, the operating includes operating the controls at the first memory location without waiting to restart the vehicle.

In an example, the controls at the second memory location include any one of radio controls or environmental controls.

In an example, the checking includes error checking for a download error.

In an example, the checking includes waiting to activate at least one control at the first memory location until a further control update is received, installed and checked when the at least one control at the first memory location depends on the further control update.

An example vehicle can include a module configured to: receive a control update to be stored at a first memory location; install the received control update at the first memory location; run the module using controls at a second memory location; check controls at the first memory location; and operate, if checking is valid, the vehicle module using the controls at the first memory location in place of the controls at the second memory location.

In an example, the vehicle module is to delay operating the controls at the first memory location until restarting the vehicle.

In an example, the controls at the second memory location include at least one of engine controls or brake controls.

In an example, the vehicle module is to operate the controls at the first memory location without waiting to restart the vehicle.

In an example, the controls at the second memory location include any one of radio controls or environmental controls.

In an example, the vehicle module is to error check for a download error.

In an example, the vehicle module is to wait to activate the controls at the first memory location until a further control update is received, installed and checked when the controls at the first memory location depend on the further control update.

DETAILED DESCRIPTION

As required, detailed examples of the present invention are disclosed herein; however, it is to be understood that the disclosed examples are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
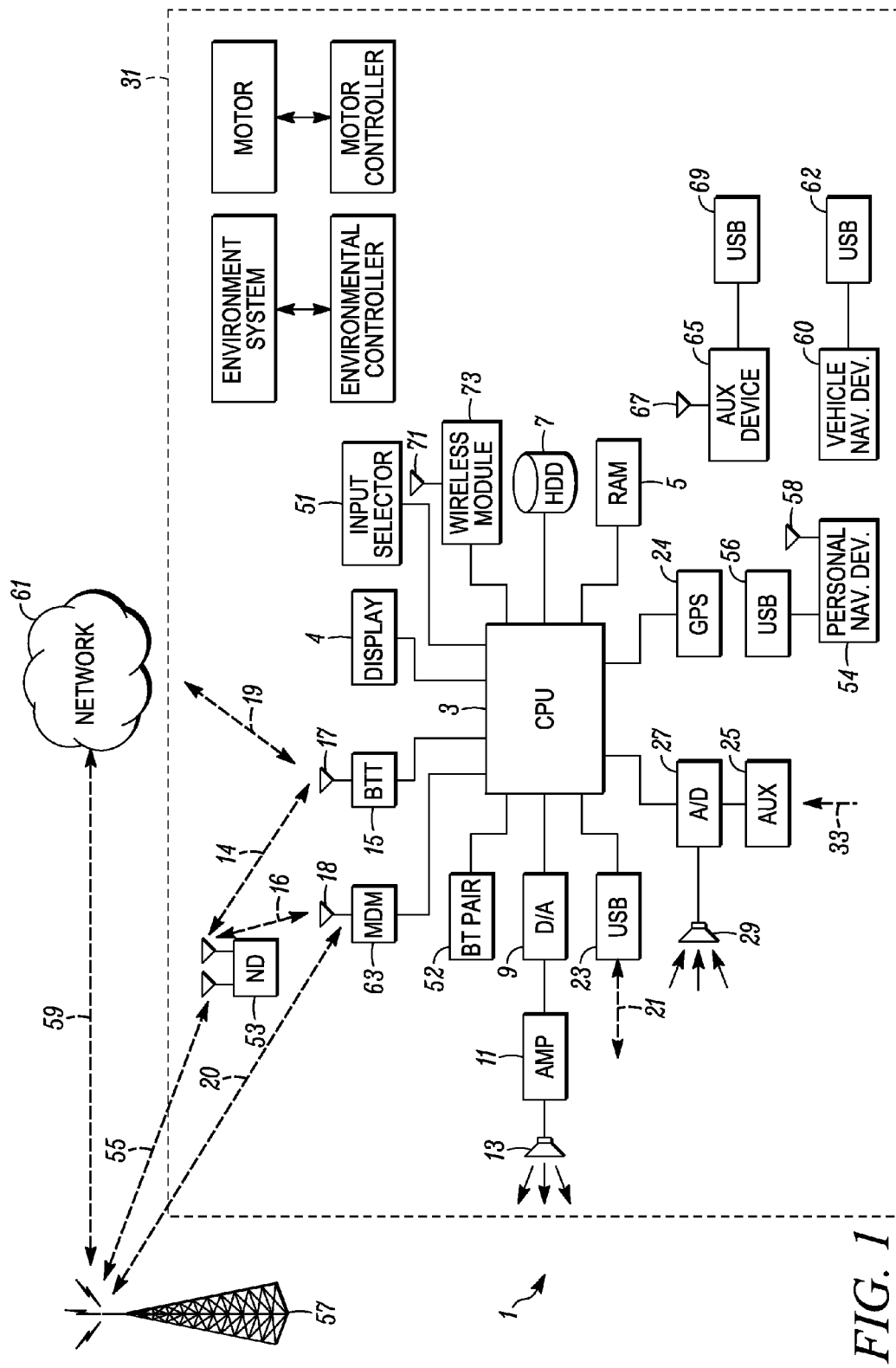
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis. The interface 4 may include an electronic control module that uses hardware to execute controls to provide a display and interaction with a user, e.g., the vehicle driver.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands, controls and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, the screen 4, which may be a touchscreen display, and a BLUETOOTH input 15 are all provided. Each of these inputs may include an electronic control module that executes controls for the various electronics of the inputs to operate. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof). Such vehicle components can be controlled by the processor 3, other electronic circuitry or electronic control modules that execute controls, which can be in the form of hardware or hardware executing the controls for a specific vehicle component.

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively. Each of these outputs may include an electronic control module that executes controls for the various electronics of the outputs to operate. In some examples, the VCS system executes controls, e.g., through electronic circuitry or electronic control modules that execute controls.

In one illustrative embodiment, the system 1 uses the BLUETOOTH transceiver 15 to communicate 17 with a portable device 53 (e.g., cell phone, smart phone, PDA, or any other device having wireless remote network connectivity). The portable device 53 can then be used to communicate 59 with a network 61 outside the vehicle 31 through, for example, communication 55 with a cellular tower 57. In some embodiments, tower 57 may be a WiFi access point.

Exemplary communication between the portable device 53 and the BLUETOOTH transceiver is represented by communication 14.

Pairing a portable device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a portable device 53.

Data may be communicated between CPU 3 and network 61 utilizing, for example, a data-plan, data over voice, or dual-tone multiple frequency (DTMF) tones associated with portable device 53. Alternatively, it may be desirable to include an onboard modem 63 having antenna 18 in order to communicate 16 data between CPU 3 and network 61 over the voice band. The portable device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a portable device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, portable device 53 includes a modem for voice band or broadband data communication. In the data-over-voice embodiment, a technique known as frequency division multiplexing may be implemented when the owner of the portable device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the portable device 53, it is possible that the data-plan allows for broadband transmission and the system could use a much wider bandwidth (speeding up data transfer). In still another embodiment, portable device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the portable device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 is itself capable of performing the exemplary processes.

While the above description of FIG. 1 refers to a vehicle 31, it will be understood that the network 61 can communicate with a plurality of vehicles at the same time. In an example, a control update for a class of vehicles can be sent to a plurality of vehicles using the network and appropriate communication channels. In an example, the communication to the vehicles is over wireless communication channels that allow the server to be remote from each of the vehicles and the vehicles to be remote from each other. The vehicles can be located anywhere, e.g., across a country, continent or around the globe.

Figure 2:
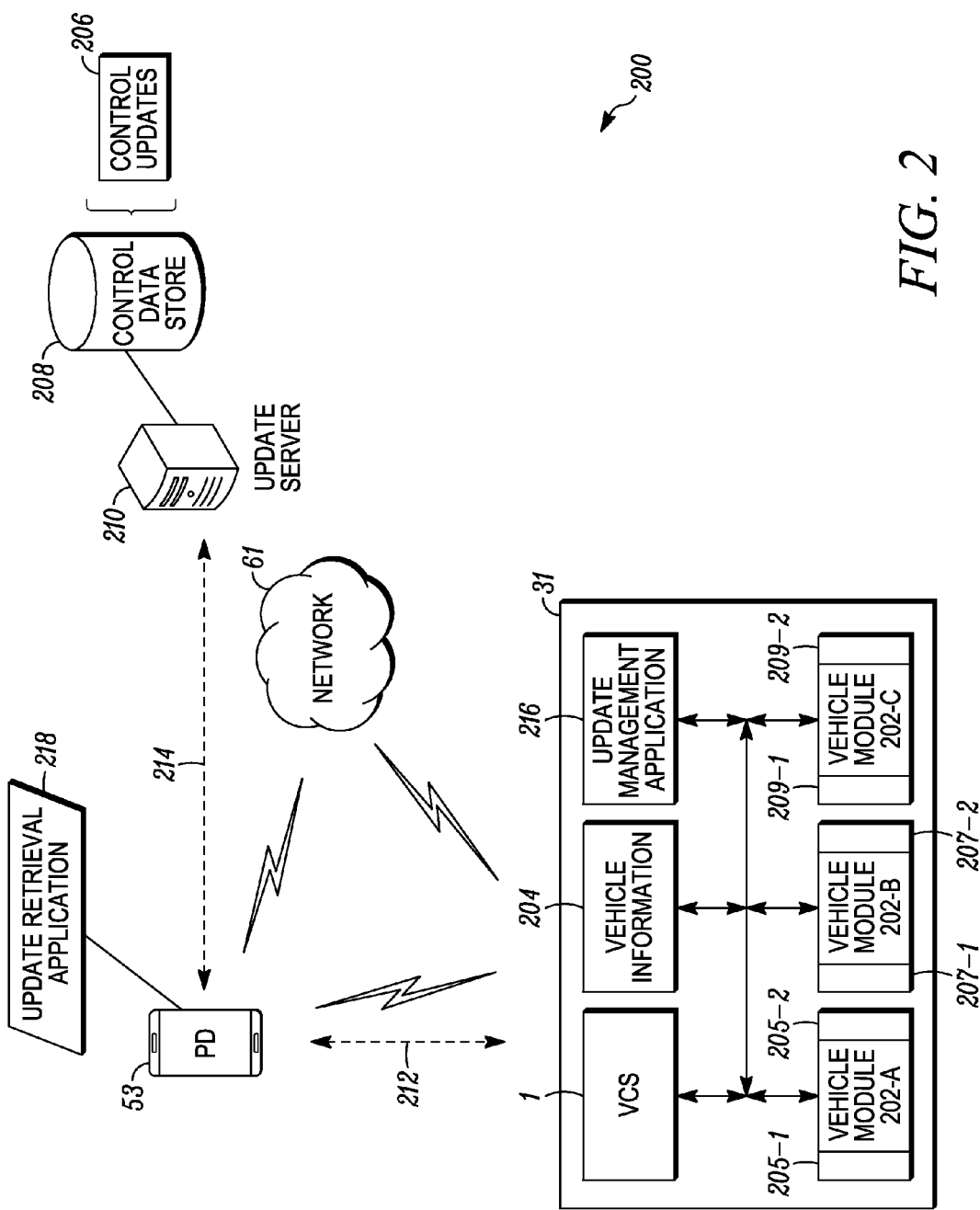
FIG. 2 illustrates an example vehicle system for providing control updates to the vehicle by way of a portable device.

FIG. 2 illustrates vehicle 31 that communicates with system 200 for providing control updates 206 to the vehicle 31 by way of electrical or electronic communication, e.g., directly via a wireless or wired network 61 or through the portable device 53. The system 200 may include the VCS 1 in communication over the network 61 with an update server 210, e.g., directly, or via the portable device 53. The update server 210 may communicate with a control instruction data store 208 configured to maintain control instruction(s) updates 206 for download. The system 200 may further include an update management application 216 installed to the vehicle 31 and configured to install control updates 206 to a plurality of modules 202-A through 202-C (collectively 202) of the vehicle 31. The modules 202-A, 202-B and 202-C each include a plurality of control instruction storage locations, here designated by 205-1 and 205-2, 207-1 and 207-2, and 209-1 and 209-2. With the modules each having a plurality of storage locations, the module can continue to execute previously loaded controls, and hence, allow the vehicle to operate, while new or updated controls are being loaded to the module. The module will continue to use prior instructions until the newly loaded instructions pass a validity check process. Thereafter the module 202-A, 202-B or 202-C may execute the newly loaded instructions. The modules 202-A, 202-B or 202-C can revert back to the prior controls if the new controls are determined to have an issue after they are first used.

The portable device 53 may be in communication with the update server 210 via a wide-area data connection 214 and with the update management application 216 of the VCS 1 via a local data connection 212. As explained in detail below, an update retrieval application 218 installed to the portable device 53 may be configured to receive indications of control updates 206 to download from the update management application 216, download the control updates 206 when the portable device 53 is connected to a suitable wide-area data connection 214 away from the vehicle 31, and provide the downloaded control updates 206 to the VCS 1 when the portable device 53 is returned to the vehicle 31. While an exemplary system 200 is shown in FIG. 2, the exemplary components illustrated in FIG. 2 are not intended to be limiting. Indeed, the system 200 may have more or fewer components, and additional or alternative components and/or implementations may be used.

The vehicle modules 202 may include various vehicle components configured to receive updates of associated controls, which can be in the form of software, firmware, or configuration settings. As some non-limiting examples, the vehicle modules 202 may include a powertrain control module (PCM), a brake system control module (BSCM), a body control module (BCM), a convenience control module (CCM), battery management module, environmental control unit, engine control module (ECM) and the VCS 1 itself.

The vehicle information 204 may include information configured to identify the vehicle 31 or the vehicle 31 configuration. For example, the vehicle information 204 may include a vehicle identification number (VIN) published to the vehicle 31 CAN bus, or subscriber identity module (SIM) information of the modem 63 such as international mobile station equipment identity (IMEI). Additionally or alternately, the vehicle information 204 may include version information for at least a portion of the hardware and software components of the vehicle modules 202 of the vehicle 31.

The control updates 206 may include changes to the control instructions or settings of the vehicle 31 to address an issue with the operation of the various vehicle modules, or to provide improved functionality to the current controls in the modules. The controls updates 206 may include, for example, updated configuration settings for one or more vehicle modules 202, and/or updated versions of controls (e.g., instructions, software or firmware) to be installed on one or more vehicle modules 202. In some cases controls updates 206 may include a single section, while in other cases controls updates 206 may be organized into multiple subsections, partitions, or chunks, where all the subsections may be downloaded to complete the overall controls update 206 to be installed.

The control data store 208 may be configured to store the control updates 206. The controls data store 208 may be further configured to store additional information regarding the maintained control updates 206. For example, the controls data store 208 may be configured to maintain indications of which vehicle module(s) 202 are associated with which controls updates 206. The controls data store 208 may further store information indicative of the compatibility of the updates 206 to vehicle model or configuration. For instance, a storage entry for a controls update 206 may indicate that the update 206 is compatible with a certain make and model of vehicle 31, or that it has a dependency on a version of another vehicle module 202 being of a particular version or versions.

The update server 210 may include one or more devices configured to serve the updates 206 stored by the data store 208 to the vehicles 31. For example, the update server 210 may be configured to receive requests for available updates 206 from vehicles 31. The requests may include vehicle information 204 to allow the update server 210 to query the data store 208 for updates 206 applicable to the vehicle 31 as it is currently configured. The server 210 may provide, responsive to the requests, indications of updates 206 to update the requesting vehicle 31 that may be downloaded and installed. The server 210 may be further configured to serve the updates 206 to devices requesting to download the updates 206 according to the provided indications.

The VCS 1 may be configured to communicate with the update server 210 over the network 61. In some cases, the VCS 1 may make use of integrated network functionality of the VCS 1, such as the internal modem 63, to facilitate communication with the update server 210. In other cases, the VCS 1 may utilize a local data connection 212 to the portable device 53 to facilitate communication with the update server 210 via a wide-area data connection 214 of the portable device 53. As an example, for a portable device 53 running the Android operating system maintained by the Open Handset Alliance of Silicon Valley, Calif., the data connection 212 may be established via a wireless Bluetooth connection. As another example, for a portable device 53 running the iOS operating system maintained by Apple, Inc. of Cupertino, Calif., the data connection 212 may additionally or alternately be established over a wired USB connection (not shown).

The portable device 53 may further be configured to establish a wide-area data connection 214 (e.g., an Internet connection) between the portable device 53 and the update server 210, such as a connection over the network 61. The portable device 53 may be further configured to maintain information regarding which wide-area data connections 214 may be preferred by the user for downloading information (or which types of wide-area data connections 214). For instance, to avoid mobile data plan overage charges, the portable device 53 may be configured to defer requests to download files when connected to the network 61 via a cellular wide-area data connection 214, and may be configured to handle the download requests (including any deferred requests) when connected to a Wi-Fi wide-area data connections 214. As another possibility, the portable device 53 may be configured to defer requests until the portable device 53 is connected to the network 61 via a wide-area data connection 214 on a list of preferred wide-area data connections 214 (e.g., selected by the user from a network control panel user interface of the portable device 53).

Due to the portable nature of the portable device 53, it should be noted that the portable device 53 may maintain a wide-area data connection 214 in some cases when it is not in communication with the VCS 1 over the data connection 212. As one example, the portable device 53 may utilize the wide-area data connection 214 over a home Wi-Fi network of the user or a public WI-FI when the portable device 53 is not paired with or within the vicinity of the vehicle 31. The portable device 53 can be removed from the vehicle, e.g., carried to and away from the vehicle by the user.

The update management application 216 may be configured to manage the installation of control updates 206 to the vehicle 31. For example, the update management application 216 of the VCS 1 may receive a command from a user requesting to check for control updates 206. As another possibility, the update management application 216 may trigger a periodic check for new control updates 206. When triggered, the update management application 216 may be configured to send a request to the update server 210 to inquire whether control updates 206 for the vehicle 31 are available. For example, the update management application 216 may query the update server 210 using the vehicle information 204 (or, if the control data store 208 maintains current vehicle information 204, an identifier of the vehicle 31), and may receive a response from the update server 210 indicative of whether new control updates 206 for the vehicle 31 are available (e.g., as links or other identifiers of control updates 206 for the vehicle 31 to download). If the response to the update management application 216 indicates control updates 206 are available for the vehicle 31, the update management application 216 may be further configured to queue those control updates 206 to be downloaded and installed. In another example, the dealership, e.g., when the vehicle 31 is at dealership for maintenance, may trigger the update management application 216 by sending a code to the vehicle and access the current versions or the controls stored in the vehicle modules 202.

The update retrieval application 218 may be configured to cause the portable device 53 to download control updates 206 over the wide-area data connection 214. For instance, the update retrieval application 218 may be configured to receive a listing of the control update 206 identified by the update management application 216 as being available for download and install. The update retrieval application 218 may be further configured to detect when the portable device 53 has access to a wide-area data connection 214 suitable for download of the control updates 206, and may perform the downloads when so connected. As an example, the update retrieval application 218 may be configured to download the updates over predefined approved connections or connection types. As a possibility, the predefined connections or connection types may be selected by the user from a network control panel user interface of the update retrieval application 218. As another possibility, the update retrieval application 218 may simply prefer certain types by default (e.g., to prefer Wi-Fi connections over cellular). The approved connections or connection types may be utilized to avoid incurring data usage charges or roaming charges for retrieving the vehicle 31 update. In one possibility, the update retrieval application 218 may be configured to download the control updates 206 while connected to a relatively high bandwidth wide-area data connection 214 away from the vehicle 31 such the user's home Wi-Fi network.

By using the facilities of the portable device 53, the vehicle 31 may accordingly be able to have its control updates 206 downloaded over wide-area data connections 214 that may be unavailable to the vehicle 31 but available to the portable device 53. Thus, the update retrieval application 218 may allow the portable device 53 to download control updates 206 when the portable device 53 is away from the vehicle 31 but connected to the network 61.

When the portable device 53 is returned to the vehicle 31, the update retrieval application 218 may be configured to provide the downloaded control updates 206 to the VCS 1.

The update retrieval application 218 may also be configured to provide status information to the update management application 216 of the VCS 1 indicating what control updates 206 or portions of control updates 206 have been downloaded. As another possibility, the update management application 216 may be configured to query the portable device 53 for the status of any downloaded control updates 206, and the update retrieval application 218 may be configured to respond with any downloaded control updates 206, as well as with status information indicating what control updates 206 or portions of control updates 206 have been downloaded.

In some cases, some control updates 206 or sections of control updates 206 may be downloaded using the portable device 53, while other control updates 206 or sections of control updates 206 may be downloaded by the vehicle 31. The update management application 216 may be further configured to manage identification of which control updates 206 or sections of control updates 206 have been downloaded, and which may still need to be updated. This updated information on what still required downloading may be provided as an updated listing by the update management application 216 to the update retrieval application 218. Thus, if a control update 206 or portion of a control update 206 is received by the VCS 1 in some other manner (e.g., by download by the VCS 1, by download using another portable device 53 associated with the VCS 1, etc.), the portable device 53 may be apprised of the update status and may remove the retrieved control update 206 from its listing of control updates 206 to download.

In another example, the update retrieval application 218 can be run on the vehicle 31, e.g., by the VCS 1. The update retrieval application 218 can operate essentially the same as described above for the portable communication device 53. The update retrieval application 218 can also be part of the update management application 216 in the vehicle.

While the above description of FIG. 2 refers to a vehicle 31 and a mobile device 53, it will be understood that the network 61 can communicate with a plurality of vehicles 31 and associated mobile devices 53 at the same time. In an example, a control update for a class of vehicles can be sent to a plurality of vehicles and a plurality of associated mobile devices 53 using the network and appropriate communication channels. Vehicles can be classified on the server 210 based on the make and model of vehicle, as well as installed features and accessories in the individual vehicle that comprise the class. An individual vehicle may be part of classes based on its engine type, entertainment system, previously installed control modules and other updatable vehicle modules. In an example, the communication to the vehicles is over wireless communication channels that allow the server to be remote from each of the vehicles and the vehicles to be remote from each other. The vehicles can be located anywhere, e.g., across a country, continent or around the globe.

Figure 3:
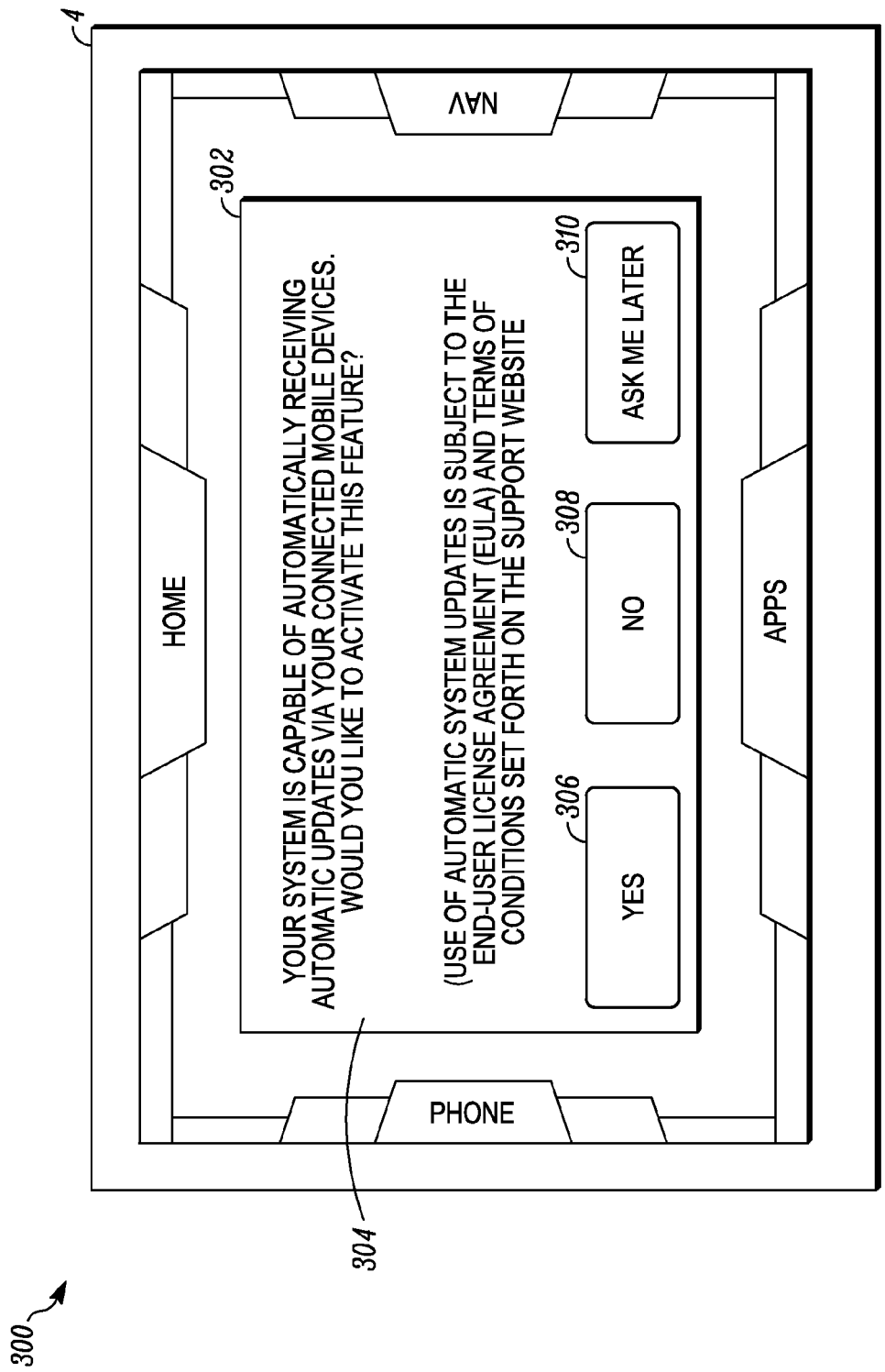
FIG. 3 illustrates an example user interface of the vehicle system for receiving consent from the user to download control updates for the vehicle by the portable device.

FIG. 3 illustrates an exemplary user interface 300 of the vehicle system 200 for receiving consent from the user to download control updates 206 for the vehicle 31 by the portable device 53 or directly by the vehicle 31 from the update server 210 through the network 61. The user interface 300 may be presented by the VCS 1 in the vehicle 31 via the display 4, and may include a message prompt 302 provided by the update management application 216 to request for the user to agree to use of the update retrieval application 218 to download control updates 206 for the vehicle 31. As illustrated, the message prompt 302 is included in the user interface 300 as a message above other content of the user interface 300. It should be noted that in other examples, the message prompt 302 may be provided in other forms, such as via a full-screen user interface.

The user interface 300 may further include controls configured to receive an indication from the user whether the user agrees to use of the update retrieval application 218. As an example, the user interface 300 may include a yes control 306 for receiving an indication from the user that the user agrees to use of the update retrieval application 218, a no control 308 for receiving an indication from the user that the user disagrees with use of the update retrieval application 218, and a ask-me-later control 310 for receiving an indication from the user that the user wishes to be provided with the message prompt 302 at a later date. If the user agrees to use of the update retrieval application 218, then the update management application 216 may utilize the update retrieval application 218 to aid in the download of control updates 206 to the vehicle 31. Otherwise, the update management application 216 may fall back to functionality not using the update retrieval application 218, such as use of the portable device 53 as a data connection (if authorized to do so by the user), use of an internal onboard modem 63 of the VCS 1, or control updates 206 may be unavailable. In some examples, the vehicle 31 will automatically download the controls and store the controls in the memory of the vehicle or in the non-current control storage in the vehicle module 202.

The user interface 300 may also be used to indicate to the user via the display that an update has been successfully downloaded and stored in the appropriate module 202. The user interface 300 can indicate to the user that the control update will be launched on the next restart of the vehicle after the control update has passed various checks. The user interface 300 can also provide a user with input controls to cause a module to roll back to the prior controls if the updated controls do not work properly for some modules if there is no safety issue with such a roll-back, e.g., only the vehicle entertainment controls can be rolled-back by the user through the user interface 300. The user interface 300 can also allow the user to enroll or confirm that his/her vehicle is a member of a class that can be updated on a global basis or elect to be part of a mass update procedure with the server.

Figure 4:
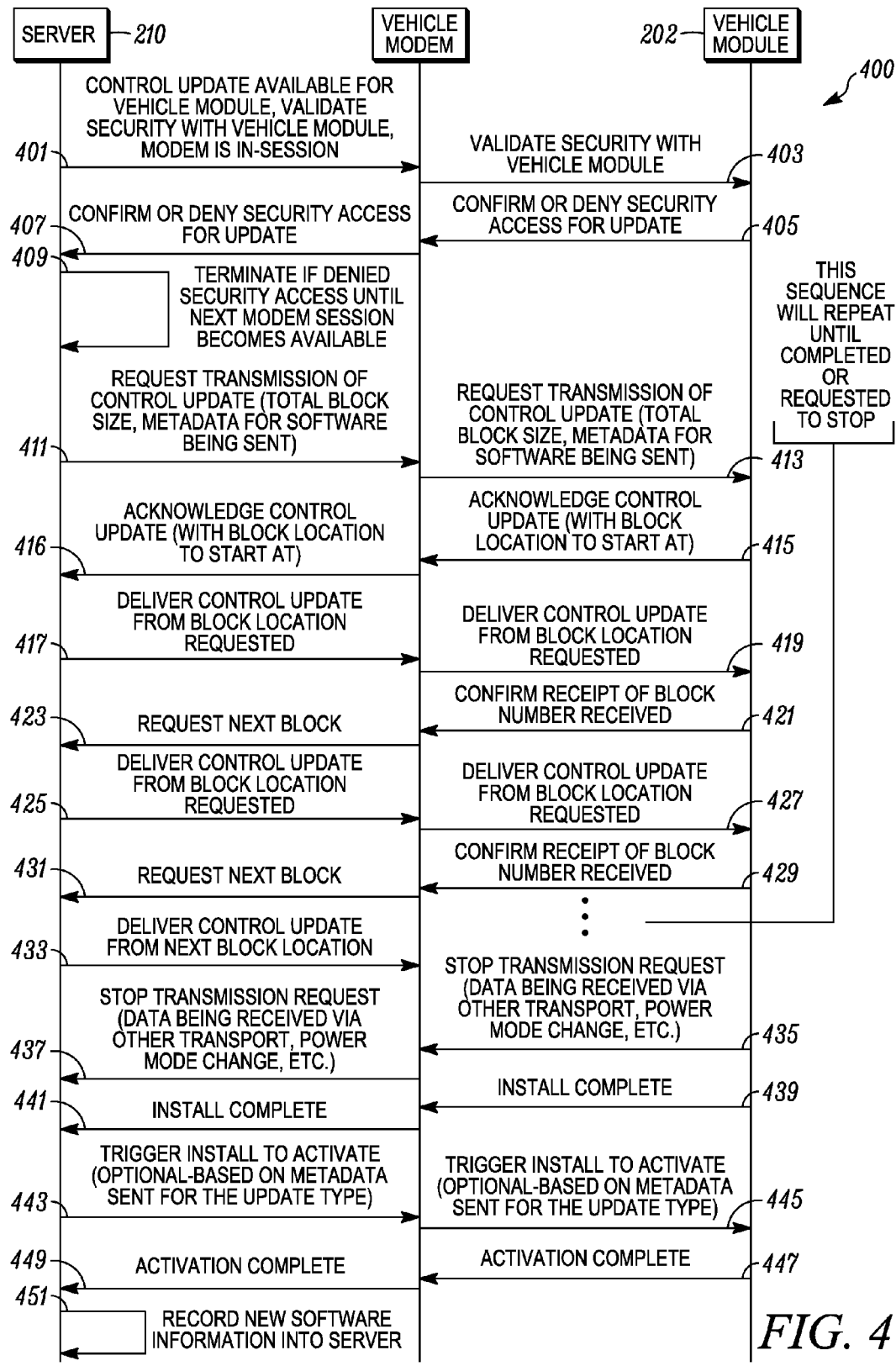
FIG. 4 illustrates an example process for utilizing the update management application to identify a control update to be installed to the vehicle.

FIG. 4 illustrates a process 400 for utilizing the update management application 216 to perform a control update 206 to the vehicle 31. The process 400 may be performed, for example, by the VCS 1 executing the update management application 216 and in communication with the update retrieval application 218 executed by the portable device 53 or the server 210. The process 400 can be made using the communication devices and other structures as described herein.

At operation 401, the server 210 indicates that a control update is available for a vehicle module. Operation 401 also can request to validate the security with a downstream module, once the modem is in communication with the server.

At operation 403, the vehicle modem can request security information from the vehicle module 202 or another location in the VCS 1. The security information can be unique identifiers for the vehicle and the specific vehicle modules in the vehicle.

At operation 405, the vehicle module 202 can send information to be used to confirm or deny security access for a control update. The vehicle module 202 can send information that represents the current control stored in the vehicle module. Other security information can include encryption data, e.g., tokens, keys, etc. If the vehicle is part of a mass update of a plurality of vehicles in a class, then the operation 405 is performed on a per vehicle basis. That is, operation 405 is performed for each vehicle.

At operation 407, the vehicle can send the security information to the server for comparison. The comparing process can act to confirm or deny security access for sending a control update from a server to the vehicle and to the vehicle module. Operation 407 is performed for each vehicle part of a mass update of a class of vehicles.

At operation 409, the server can terminate the update process 400 if any of the vehicle module, the vehicle, e.g., VCS1, or the server denies the control update. The next time the vehicle contacts the server or the server receives a new control update, the process 400 can start anew at operation 401. Operation 409 is performed on an individual basis with a single vehicle or on a mass basis to a plurality of vehicles that are part of class to receive the control update.

At operation 411, the server can send to the vehicle information about the control update. This information can include the total block size, metadata, encryption keys, or other information about the control update as needed for verification of the complete and accurate transmission of the control update to the vehicle or vehicle module.

At operation 413, the control update information is received at the vehicle, e.g., at the modem, and sent to the vehicle module.

At operation 415, the vehicle module confirms receipt of the control update information to the vehicle. At operation 416, the vehicle confirms receipt of the control update information to the server.

At operation 417, the server sends the control update to the vehicle. At operation 419, the vehicle stores the control update in the vehicle module. If the control update is delivered in blocks of data, then the server also sends the block number to the vehicle, which passes the block number to the vehicle module.

At operation 421, the vehicle module confirms receipt of the block by sending its block number to the vehicle.

At operation 423, the vehicle can request the next block from the server. This request can include sending the block number that has been successfully stored in the vehicle module to the server. In an example, the vehicle tracks the received block numbers and merely requests the next block from the server.

At operation 425, the server sends the next control update to the vehicle. At operation 427, the vehicle stores the control update in the vehicle module. If the control update is delivered in blocks of data, then this next control update is the next block to the vehicle, which passes this next block number to the vehicle module.

At operation 429, the vehicle module confirms receipt of the block by sending its block number to the vehicle.

At operation 431, the vehicle can request the next block from the server. This request can include sending the block number that has been successfully stored in the vehicle module to the server. In an example, the vehicle tracks the received block numbers and merely requests the next block from the server.

At operation 433, the server sends the next control update to the vehicle. The operations 421-433 can be repeated until the entire control update is sent to and stored in the vehicle module.

At operation 435, the vehicle module sends a stop data transmission request to the vehicle communication device. The stop data transmission request can be due to a complete download of the control update (operation 439) or can be an interruption of the current transmission (operation 435), e.g., by a power interruption, turning off the vehicle, lack of communication link to the server, either from the vehicle or through the portable device. The interrupt can also be triggered by another transport of the vehicle control module update, e.g., a direct, wired connection.

At operation 437, the vehicle sends the stop data request from the vehicle to the server.

At operation 439, the install complete instruction is sent from the vehicle module to the vehicle. At operation 441, the vehicle sends the installation complete instruction to the server.

At operation 443, the server recognizes that the vehicle module indicates that the install of the control update was received by the vehicle module.

At operation 445, the vehicle sends the install complete signal to the vehicle module and can trigger an activation procedure. This activation procedure can perform validity checks on the control update stored in a non-active location in the vehicle module memory. Validity checks can include checksum, hashchecks, block checks, error-correcting codes, etc. The validity checks can also include simulation using the downloaded instructions for the control update. The control update is not actually running the module or actively controlling parts of the operation of the vehicle. Instead virtual inputs are input into the control update and resulting outputs are stored. If this is valid and the control update does not depend on another update, then the control update can be put into active use. The active use can be immediate. The active use can be delayed until the next start of the vehicle. The active use can also be delayed until further triggered by other instructions to start the control update for the vehicle module.

At operation 447, the vehicle indicates that downloaded control update is active. The control update is the controls for the vehicle module being used in the vehicle.

At operation 449, the vehicle sends to the server the information that activation is complete and the vehicle module is using the control update.

At operation 451, the server records the controls being loaded into the vehicle modules. This new or updated controls in the vehicle and the vehicle modules is stored in the server, which can use this information to assist starting a new update process when the server determines new controls are in the server relative to a specific vehicle and the specific controls in the specific vehicle.

It will be appreciated that a server using the method of FIG. 4 can send a control update to a single vehicle or broadcast to a plurality of vehicles. The plurality of vehicles can be part of a class of vehicles that are identified as needing the control update.

Figure 5:
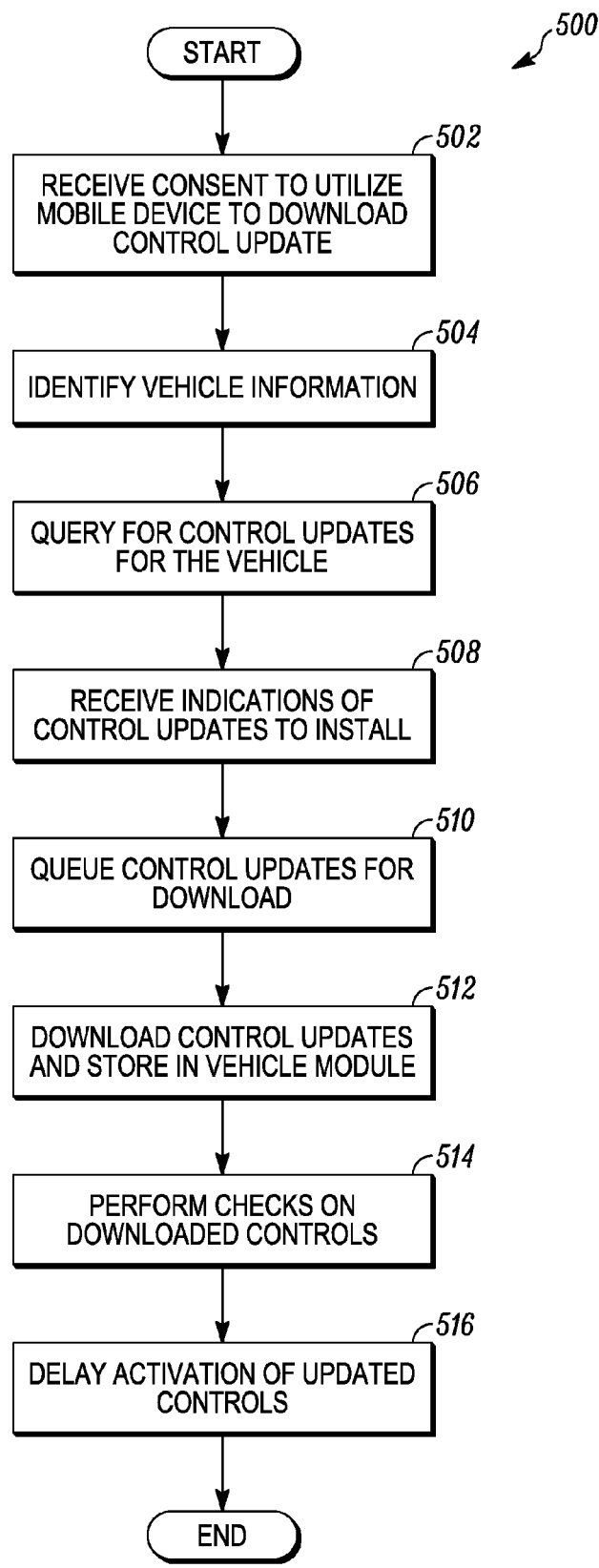
FIG. 5 illustrates an example process for utilizing the update management application to identify control update to be installed to the vehicle.

FIG. 5 illustrates a process 500 for utilizing the update management application 216 to perform a control update 206 to the vehicle 31. The process 500 may be performed, for example, by the VCS 1 executing the update management application 216 and in communication with the update retrieval application 218 executed by the portable device 53.

At operation 502, the update management application 216 receives consent from the user to utilize the update retrieval application 218 executed by the portable device 53 to download control update(s) 206. For example, the update management application 216 may present the message prompt 302 to the user via the display 4, and may receive input via the yes control 306 that the user agrees to use of the update retrieval application 218 to aid in the download of control updates 206 to the vehicle 31. In some examples, the vehicle 31 can automatically check for updates and download same without input from the user. In such a case the vehicle can request the user authorize use of the updated control after the control is downloaded. In another example, the vehicle can automatically use the control update if such an update is deemed to be critical by the update provider, e.g., server 210.

At operation 504, the update management application 216 identifies vehicle information 204. For example, the VCS 1 may be configured to query for existence and version information for at least a portion of these hardware and software components of the vehicle modules 202 of the vehicle 31.

At operation 506, the update management application 216 queries for control updates 206 for the vehicle 31. For instance, the update management application 216 may be configured to send a request to the update server 210 to inquire whether control updates 206 for the vehicle 31 are available. In an example, the update management application 216 may query the update server 210 using an identifier of the vehicle 31 (e.g., vehicle 31 VIN, vehicle 31 SIM information, etc.).

At operation 508, the update management application 216 receives indications of control updates 206 to install. For example, responsive to the query for control updates 206 for the vehicle 31, the update management application 216 may receive from the update server 210 a response indicative of whether new control updates 206 for the vehicle 31 are available (e.g., as links or other identifiers of control updates 206 for the vehicle 31 to download).

At operation 510, the update management application 216 queues the control updates 206 to be installed. For example, if the response to the update management application 216 from the update server 210 indicates control updates 206 are available for the vehicle 31, the update management application 216 may be further configured to queue those control updates 206 to be downloaded and installed.

At operation 512, the update server 210 sends the control updates through the network 61 to the portable device 53 for later installation to the vehicle 31 or directly to the vehicle 31. The downloaded control update 206 is then stored in vehicle memory, e.g., a currently non-active storage of a module 202. In an example, the vehicle modules 202 are all using their first memory locations, e.g., 205-1, 207-1 and 209-1 (FIG. 2). Any control update for the vehicle modules are stored in the second memory locations, e.g., 205-2, 207-2 and 209-2 (FIG. 2).

At operation 514, various checks are performed on the downloaded control update stored in the module 202. Checking of the control can be done using various checking techniques, e.g., checksum, hashchecks, block checks, error-correcting codes, etc. If the control update in the vehicle module 202 successfully passes the error checking, then the downloaded control update can be flagged as valid and ready for use. This can cause the VCS 1 to indicate to the user through the display 4 that the new control is ready for use. The flag can also indicate to the VCS 1 and module whether or not the valid control should be immediately replace the currently running control, e.g., the module 202 switch from control in a first memory to control in the second memory, or wait until the next vehicle start. Immediate activation may not be available for motor controls, braking systems or other important vehicle operations. Immediate activation may be available for some user interaction, e.g., radio tuner, portable device pairing or communication, speaker amplification, entertainment system, etc.

At operation 516, the activation of the controls is determined, which can include checking to determine if the downloaded control is operable with other currently running controls or requires an update of another control. If the downloaded control requires an update to another control, then the downloaded control is flagged to not be operated until the another control is updated. For example and with reference to FIG. 2, a control update is loaded into memory 205-2 in module 202-A. Module 202-A is currently running controls stored in memory 205-1. The control update in memory 205-2 is dependent on the controls being run on module 202-B. However, module 202-B is also running controls from its first memory location 207-1, which controls are incompatible with the downloaded controls in memory 205-2. The downloaded controls in memory 205-2 are checked for errors and then flagged as not to be put into use until after new controls are downloaded to module 202-B. Both of these new controls for modules 202-A and 202-B are not used until each have been stored in the module and passed an error check.

After 516, the process 500 ends.

Figure 6:
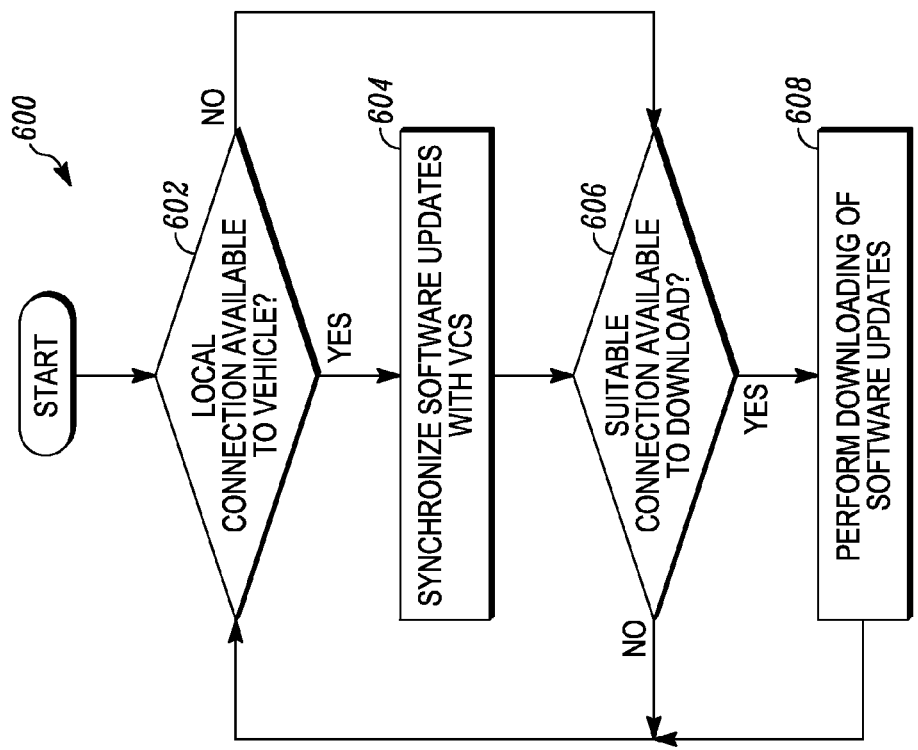
FIG. 6 illustrates an example process for utilizing the update retrieval application to download a software update by way of a nomadic device.

FIG. 6 illustrates a process 600 for utilizing the update retrieval application 218 to download software update 206 by way of the portable device 53. The process 600 may be performed, for example, by the VCS 1 executing the update management application 216 and in communication with the update retrieval application 218 executed by the portable device 53.

At operation 602, the update retrieval application 218 determines whether a local data connection 212 to the VCS 1 is available. As an example, for a portable device 53 running the Android operating system (other operating systems can also be used, e.g., Blackberry OS 10, iOS, or mobile Microsoft OS), the update retrieval application 218 may determine whether the portable device 53 indicates that a data connection 212 is established with the VCS 1 via a wireless Bluetooth connection. If the update retrieval application 218 determines that the local data connection 212 to the VCS 1 is available, control passes to operation 604. Otherwise control passes to operation 606.

At operation 604, the update retrieval application 218 synchronizes the software updates 206 to be installed with the update management application 216. For example, the update retrieval application 218 may be configured to receive a listing of the software update 206 identified by the update management application 216 as being available for download and install. As another example, the update retrieval application 218 may be configured to provide status information to the update management application 216 of the VCS 1 indicating what software updates 206 or portions of software updates 206 have been downloaded to the portable device 53.

At operation 606, the update retrieval application 218 determines whether a wide-area data connection 214 between the portable device 53 and the update server 210 is available. For instance, the update retrieval application 218 may detect when the portable device 53 has access to a wide-area data connection 214 suitable for download of the software updates 206, and may perform the downloads when so connected. For example, the update retrieval application 218 may be configured to download the updates over predefined approved connections or connection types, to avoid incurring usage charges or roaming charges for capturing the vehicle 31 update. As one possibility, the update retrieval application 218 may be configured to download the software updates 206 while connected to a relatively high bandwidth wide-area data connection 214 away from the vehicle 31 such the user's home Wi-Fi network. If a suitable wide-area data connection 214 is available, control passes to operation 608. Otherwise, control passes to operation 602.

At operation 608, the update retrieval application 218 performs downloading of software updates 206. Accordingly, by using the facilities of the portable device 53, the vehicle 31 may be able to have its software updates 206 downloaded over wide-area data connections 214 that may be unavailable to the vehicle 31 but available to the portable device 53. Thus, the update retrieval application 218 may allow the portable device 53 to download software updates 206 when the portable device 53 is away from the vehicle 31 but connected to the network 61. After operation 608, control passes to operation 602.

Figure 7:
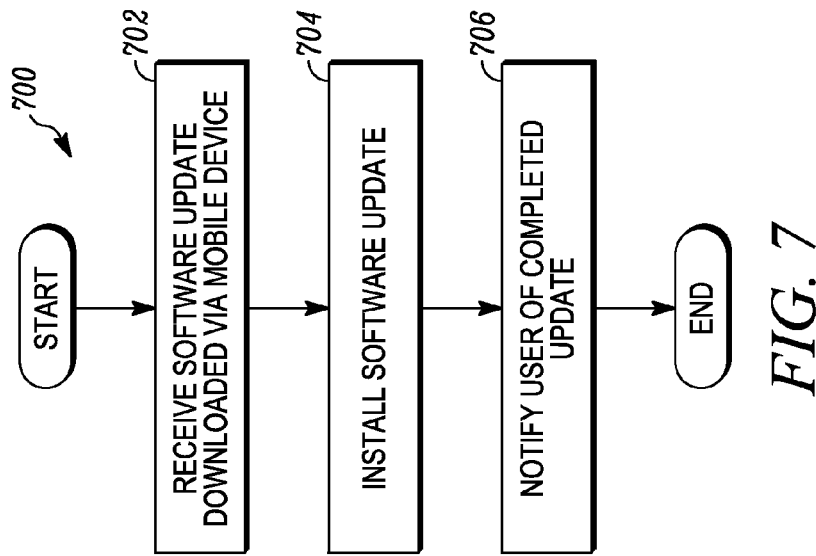
FIG. 7 illustrates an example process for installing downloaded software updates to the vehicle.

FIG. 7 illustrates a process 700 for installing downloaded software updates 206 to the vehicle 31. The process 700 may be performed, for example, by the VCS 1 executing the update management application 216 and in communication with the update retrieval application 218 executed by the portable device 53.

At operation 702, the update management application 216 receives a software update 206 downloaded by the portable device 53. For example, when the portable device 53 is returned to the vehicle 31 after downloading a software update 206 via a suitable wide-area data connection 214, the update retrieval application 218 may be configured to provide the downloaded software updates 206 to the VCS 1.

At operation 704, the update management application 216 installs the downloaded software update 206. For example, the update management application 216 may provide the updated configuration or software to the vehicle module 202 or modules 202 being updated.

At operation 706, the update management application 216 notifies the user of the completed update. For example, the update management application 216 may present the message prompt 402 to the user via the display 4 to inform the user of the installation of software updates 206 to the vehicle 31. After operation 706, the process 700 ends.

Figure 8:
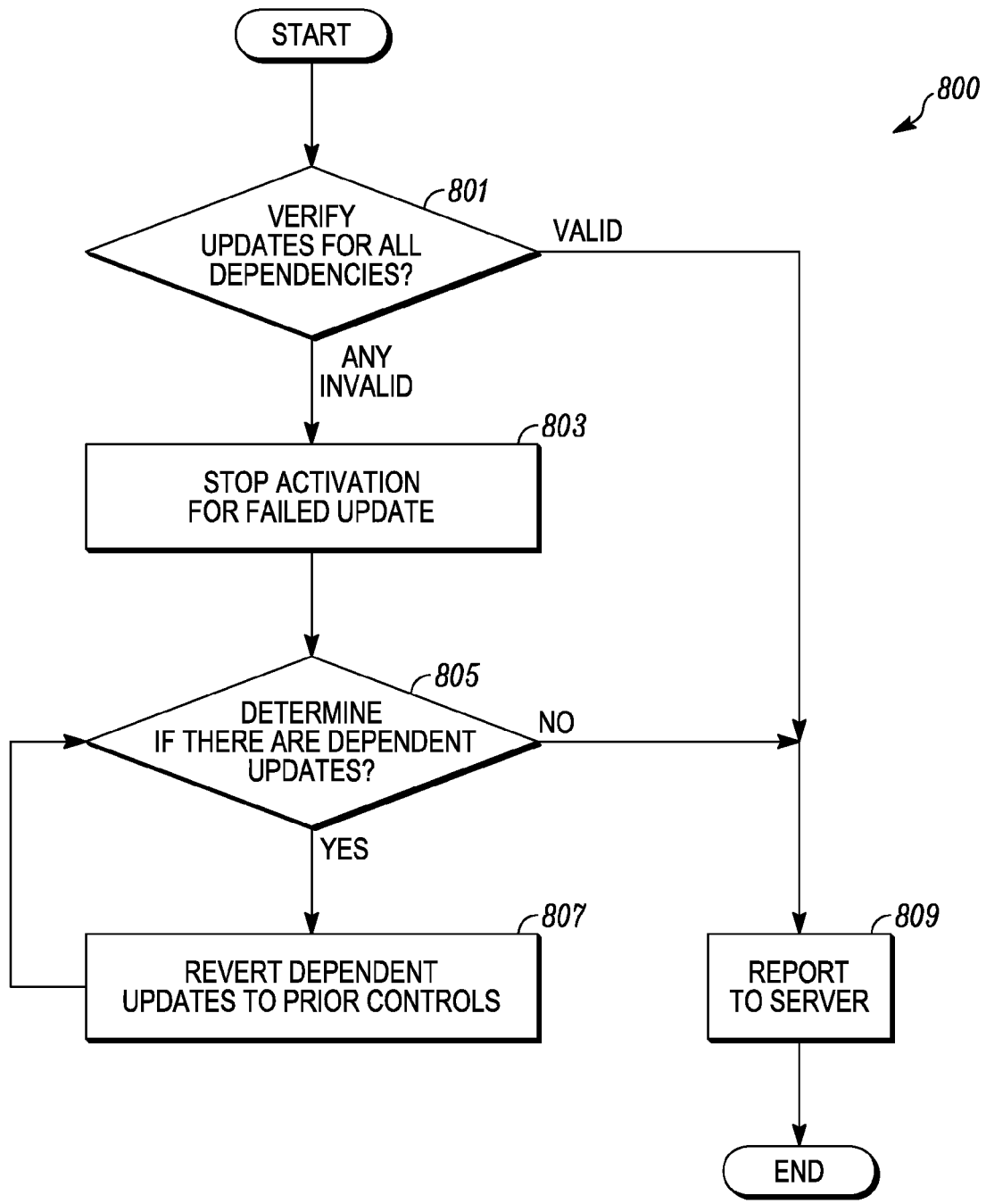
FIG. 8 illustrates an example process for updating control updates to the vehicle.

FIG. 8 illustrates a process 800 for utilizing the update management application 216 to perform a control update 206 to the vehicle 31. The process 800 may be performed, for example, by the VCS 1 executing the update management application 216 and in communication with the update retrieval application 218 executed by the portable device 53. In an example, the process 800 may be performed after the process described above with reference to FIGS. 4-7.

At operation 801, the control updates loaded into the vehicle 31, e.g., stored in memory or in separate modules, are verified to be valid. Verification of the control updates can be done through various testing in the vehicle, e.g., by the VCS 1. The verification can test the validity of the instructions in the control updates. In some instances the control updates may be dependent on another control or control update. When there are multiple control updates, the verification is performed on all control updates. If all of the control updates are verified, then the process 800 reports the positive verification for all control updates to the server 210 at operation 809. If at least one control update fails verification, then process 800 moves to operation 803.

At operation 803, the activation of the failed control update is stopped and will go active in the vehicle. The failed control update will not be used to control any module in the vehicle.

At operation 805, it is determined if there are any control updates that are dependent on failed or unverified control update. If there are no control updates that are dependent on the failed control update, then the process 800 moved to operation 809. If there are control updates that depend on the failed control update, then these control updates revert to their prior versions. The process 800 then loops back to operation 805 to check for additional dependent updates that depend on any of the reverted updates. That is, if a first control update fails and a second control update depends on the first control update both the first and second controls remain or are changed back to their prior version. A third control update may depend on the second control update, which has no reverted to a prior version of the control. This third control update is now reverted to it prior version as this control update depends on a version of the second control update not now being used in the vehicle. This loop can iterate until there are no further depended control and then report the status of the control(s) and control update(s) to the server 210 at operation 809. Thereafter, the process 800 can end.

Variations on the disclosed processes are possible. For example, in some cases the update retrieval application 218 may be configured to query the update server 210 for the software updates 206 to be installed. As another example, in some cases the update retrieval application 218 may be configured to prioritize certain software updates 206 over other updates. For example, if a software update 206 to be installed is indicated as being a high priority update, then the update retrieval application 218 may be configured to retrieve that high priority software update 206 over any available connection, without waiting for a preferred connection or connection type.

The examples described herein allow the vehicle to continue to operate while a control update is sent to the vehicle and loaded to a vehicle module. The use of a plurality of memory locations in a vehicle module allows the module to store both non-active and active controls. The storage of control updates in a location that is not currently active in the module allows the vehicle time to perform checks as to validity of the controls and operability of the controls, both within the vehicle module and in use with other vehicle modules and components.

The examples described herein allow a control update to be sent to a single vehicle or broadcast to a plurality of vehicles. The plurality of vehicles can be part of a class of vehicles that are identified as needing the control update. The source of the control update is a server the is remote from the vehicle receiving the update and a communication channel to the vehicle, e.g., wireless communication, is used to transmit the control update to the vehicle or its proxy of a mobile device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle module controls updating method comprising:
    receiving, by the vehicle module in a vehicle, control update sections of a control from at least a server remote from the vehicle and a mobile device to load a complete control update in the vehicle, wherein the receiving includes:
        receiving, by the vehicle module, control update sections from the server remote from the vehicle until transmission directly to the vehicle is terminated;
        terminating, by the vehicle module, communication to the remote server if security access is denied, wherein the communication is not restored until a next modem session is available;

upon termination of communication to the remote server, receiving the control update sections at the mobile device associated with the vehicle; and when a next modem session is available, stop receiving the control update sections at the mobile device and resume receiving control update sections, from the remote server, at the vehicle, wherein the resume receiving of control update sections includes forwarding the control update sections previously downloaded to the mobile device to the vehicle;

sending, by the vehicle module, a section identifier back to the remote server directly from the vehicle after receiving the control update sections to the mobile device to identify the control sections stored in the vehicle;

integrating and installing, by the vehicle module, the sections of the control update in the vehicle, wherein the integrating and installing comprises:

integrating, by the vehicle module, the received control update sections of a control at a first memory location of the vehicle while using current controls at a second memory location of the vehicle;

validating, by the vehicle module, the operation of the control at the first memory location;

if the operation of the control is valid, switching by the vehicle module, the vehicle from using the controls at the second memory location to the controls at the first memory location.

2. The method of claim 1, wherein operating includes delaying operating the controls at the first memory location until restarting the vehicle.

3. The method of claim 1, wherein the operating includes operating the controls at the first memory location without waiting to restart the vehicle.

4. The method of claim 3, wherein the controls at the second memory location include any one of radio controls or environmental controls and wherein operating the vehicle-module includes returning to the vehicle-module controls at the second memory location with a check of the controls at the second memory location not causing a conflict with other vehicle-module controls.

5. The method of claim 1, wherein the checking includes error checking for a download error.

6. The method of claim 1, wherein the checking includes waiting to activate the controls at the first memory location until a further control update is received, installed and checked if the controls at the first memory location depend on the further control update.

7. The method of claim 1, wherein the checking includes reverting to a prior control if the control update fails checking and further checking other control updates to determine if any other control update depends on a control update that has been reverted and then if a dependency between the control updates exists, reverting the other control updates to a prior version.

8. The method of claim 1, wherein receiving a vehicle-module control update via sections from both a mobile device and directly to the vehicle includes sending a section identifier back to the update server directly from the vehicle and not through the mobile device and requesting the next section from the update server; and wherein integrating includes checking to ensure all sections are received before integrating the received control update sections at the first memory location.

9. The method of claim 1, wherein the first section is different than the second section.

10. A vehicle comprising:

a processor and a modem;

a vehicle module executing on the processor for receiving control update sections of a control from at east a server remote from the vehicle and a mobile device to load a complete control update in the vehicle and configured to:

receive control update sections from the server remote from the vehicle until transmission directly to the vehicle is terminated;

terminate communication to the remote server if security access is denied, wherein the communication is not restored until a next, modern session is available;

upon termination of communication to the remote server, receive the control update sections at the mobile device associated with the vehicle; and when a next modem session is available, stop receiving the control update sections at the mobile device and resume receiving control update sections from the server at the vehicle, wherein the resume receiving of control update sections includes forwarding the control update sections previously downloaded to the mobile device;

send a section identifier back to the remote server directly from the vehicle after receiving the control update sections from the mobile device to identify the control sections stored in the vehicle;

integrate and install the sections of the control update in the vehicle, wherein integrate and install comprises:

integrate, the received control update sections of a control at a first memory location of the vehicle while using controls at a second memory location of the vehicle;

validate the operation of the control at the first memory location;

if the operation of the control is valid, switch the vehicle from using the control at the second memory location to the controls at the first memory location.

11. The vehicle of claim 10, wherein the vehicle module is to delay operating the controls at the first memory location until restarting the vehicle.

12. The vehicle of claim 11, wherein the controls at the second memory location include at least one of engine controls and brake controls.

13. The vehicle of claim 10, the vehicle module is to operate the controls at the first memory location without waiting to restart the vehicle.

14. The vehicle of claim 13, wherein the controls at the second memory location include one of radio controls and environmental controls.

15. The vehicle of claim 10, the vehicle module is to error check for a download error.

16. The vehicle of claim 10, the vehicle module is to wait to activate the controls at the first memory location until a further control update is received, installed and checked if the controls at the first memory location depend on the further control update.

17. The vehicle of claim 16, wherein the vehicle module is to check any control update for dependency on any additional control update and revert any dependent control update to a prior control if the control update fails a check operation.

18. A vehicle module control updating method comprising:

sending a control update for a class of vehicle from an update server remote from the vehicles in the class to a vehicle module in a vehicle and a mobile device to load a complete control update in the vehicle, wherein the sending:

sending the control update sections from the update server remote from the vehicle until transmission directly to the vehicle is terminated;

terminating communication from the remote update server if security access is denied, wherein the communication is not restored until a next modem session is available;

upon termination of communication from the remote update server, sending sections of the control update from the remote update server to a mobile device associated with a specific vehicle; and when a next modem session is available, stopping sending sections of the control update to the mobile device and resume sending sections of the control update from the remote update server to the vehicle, wherein the resume sending sections of the control update includes forwarding the sections of the control update previously downloaded to the mobile device;

sending a section identifier back to the update server directly from the vehicle after downloading the control update section from the mobile device to identify the control sections stored in the vehicle;

integrating and installing the sections of the control update in the vehicle, wherein the integrating and installing comprises:

integrating, by the vehicle module, the received sections of the control update at a first memory location of the vehicle while using current controls at a second memory location of the vehicle;

receiving a confirmation that the sent control update is received by the vehicle and stored at a first memory location with the vehicle operating the control from a second location;

receiving confirmation that the control update has passed a check including checking to determine if the received control update is dependent on a second control update that has not passed a check, waiting to install the control update until the second control update is received and installed; and validating, by the vehicle module, the operation of the control at the first memory location;

if the operation of the control is valid, switching by the vehicle module, the vehicle from using the controls at the second memory location to the controls at the first memory location; and storing the control now being FUJI on a vehicle as the control at the first location and storing that the prior control at the second location is not being run and will be erased.

19. The method of claim 18, wherein storing includes waiting to activate the controls at the first memory location until a further control update is received, installed and checked if the controls at the first memory location depend on the further control update.

20. The method of claim 18, wherein the storing includes storing that the vehicle has reverted to a prior control if the control update fails checking and further checking other control updates to determine if any other control update depends on a control update that has been reverted and then if a dependency between the control updates exists, reverting the other control updates to a prior version.

21. The method of claim 18, wherein storing includes storing that a vehicle module is to delay operating the controls at the first memory location until restarting the vehicle, wherein the controls at the second memory location include at least one of engine controls, brake controls, radio controls, environmental controls or combinations thereof.

* * * * *